United States Patent
Kwon (10) Patent No.: US 9,321,420 B2
(45) Date of Patent: Apr. 26, 2016

(54) AIRBAG APPARATUS

(71) Applicant: HYUNDAI MOBIS Co., Ltd., Yongin-si, Gyeonggi-do (KR)

(72) Inventor: Oh Koang Kwon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/523,997

(22) Filed: Oct. 27, 2014

(65) Prior Publication Data

US 2015/0123384 A1 May 7, 2015

(30) Foreign Application Priority Data

Nov. 1, 2013 (KR) .................... 10-2013-0132426

(51) Int. Cl.
*B60R 21/2165* (2011.01)

(52) U.S. Cl.
CPC ................ *B60R 21/21656* (2013.01)

(58) Field of Classification Search
CPC ............ B60R 21/21656; B60R 21/2165; B60R 21/217
See application file for complete search history.

(56) References Cited

U.S. PATENT DOCUMENTS

| | | | | |
|---|---|---|---|---|
| 4,903,986 A * | 2/1990 | Cok | ................... | B60R 21/2035 280/728.2 |
| 5,096,220 A * | 3/1992 | Nakajima | ......... | B60R 21/21656 280/728.3 |
| 5,118,132 A * | 6/1992 | Nakajima | ......... | B60R 21/21656 280/728.3 |
| 5,201,541 A * | 4/1993 | Jones | ................... | B60R 21/217 220/786 |
| 5,248,532 A * | 9/1993 | Sawada | ................... | B32B 27/08 280/728.3 |
| 5,320,380 A * | 6/1994 | Hamada | ............ | B60R 21/21656 280/728.3 |
| 5,582,428 A * | 12/1996 | Buchanan | ............. | B60R 21/272 222/3 |
| RE36,003 E * | 12/1998 | Sato | ................... | B60R 21/21656 280/728.3 |
| 5,913,534 A * | 6/1999 | Klingauf | ........... | B60R 21/21656 280/728.3 |
| 6,001,295 A * | 12/1999 | Yamamoto | .......... | B29C 37/0057 264/296 |
| 6,626,459 B2 * | 9/2003 | Takimoto | ............ | B60R 21/2035 280/731 |
| 7,213,832 B2 * | 5/2007 | Hayashi | .............. | B60R 21/2165 280/728.3 |
| 7,354,060 B2 * | 4/2008 | Thomas | ............ | B60R 21/21656 280/728.3 |
| 7,390,013 B2 * | 6/2008 | Chavez | ............. | B60R 21/21656 280/728.3 |
| 2002/0014764 A1 * | 2/2002 | Anglsperger | ......... | B60R 21/216 280/743.1 |
| 2004/0207181 A1 * | 10/2004 | Hayashi | .............. | B60R 21/2165 280/728.3 |
| 2005/0275197 A1 * | 12/2005 | Kaifuki | ............. | B60R 21/21656 280/728.3 |
| 2006/0202446 A1 * | 9/2006 | Chavez | ............. | B60R 21/21656 280/728.3 |
| 2012/0074675 A1 * | 3/2012 | Hayashi | ............ | B60R 21/21656 280/728.3 |

* cited by examiner

*Primary Examiner* — Ruth Ilan
*Assistant Examiner* — Darlene P Condra
(74) *Attorney, Agent, or Firm* — Paratus Law Group, PLLC (57) ABSTRACT

An airbag apparatus according to the present exemplary embodiment includes: an airbag housing which accommodates an airbag; and an airbag cover which is coupled to the airbag housing while covering the airbag accommodated in the airbag housing, and has a tear line that is torn by expansive force of the airbag, in which the airbag cover is opened while being rotated about a portion between both ends of the tear line as a rotation center when the tear line is torn, and first notch portions, which are cut out in a direction in which the first notch portions cross both ends of the tear line, are formed at both ends of the tear line, respectively, thereby allowing the airbag to be deployed in accordance with design intention.

18 Claims, 5 Drawing Sheets

AIRBAG APPARATUS

CROSS-REFERENCE TO RELATED APPLICATIONS

The present application claims priority to Korean Patent Application Number 10-2013-0132426 filed Nov. 1, 2013, the entire contents of which the application is incorporated herein for all purposes by this reference.

TECHNICAL FIELD

The present invention relates to an airbag apparatus, and more particularly, to an airbag apparatus in which a tear line, which is torn by expansive force of an airbag, is formed on an airbag cover.

BACKGROUND

In general, an airbag, which is a safety device that is inflated at the time of an accident and deployed between an occupant and a structure in a vehicle so as to protect the occupant using cushioning, is mounted in the vehicle.

The airbag is folded several times and accommodated in an airbag housing so as to be mounted in the vehicle, and thereafter, the airbag is covered by an airbag cover.

The airbag is mounted on a steering wheel in order to protect a driver, or mounted at an upper side of a glove box that is disposed in front of a front passenger seat, and the airbag may be installed at various positions.

Therefore, the airbag cover defines a part of an external appearance of the steering wheel, or defines a part of an external appearance of an instrument panel that is provided at an upper side of the glove box.

At the time of a vehicle accident, the airbag is inflated by gas generated by a gas generator, and deployed while breaking through the airbag cover so as to protect the occupant. Therefore, a tear line, which is torn by expansive force of the airbag so that the airbag may be deployed while breaking through the airbag cover, is formed on a back surface of the airbag cover.

However, the tear line needs to be properly torn in order to deploy the airbag in accordance with design intention, but there occurs an over tear phenomenon in which during a process in which the tear line is torn, torsion stress is applied to the airbag cover due to expansive force of the airbag, and thereby, the airbag cover is torn beyond the tear line, and as a result, there is a problem in that the airbag cannot be properly deployed.

SUMMARY

The present invention has been made in an effort to provide an airbag apparatus in which an airbag may be deployed in accordance with design intention by preventing an over tear phenomenon of a tear line.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag housing which accommodates an airbag; and an airbag cover which is coupled to the airbag housing while covering the airbag accommodated in the airbag housing, and has a tear line that is torn by expansive force of the airbag, in which the airbag cover is opened while being rotated about a portion between both ends of the tear line as a rotation center when the tear line is torn, and first notch portions, which are cut out in a direction in which the first notch portions cross both ends of the tear line, are formed at both ends of the tear line, respectively.

In the airbag apparatus according to the present exemplary embodiment, second notch portions, which are spaced apart from the first notch portions and cut out in a direction in which the second notch portions cross both the ends of the tear line, may be further formed.

Other detailed matters of the exemplary embodiment are included in the detailed description and the drawings.

According to the airbag apparatus according to the present invention, the first notch portions are formed at both ends of the tear line, respectively, and the first notch portions reduce torsion stress being transmitted to a portion between both the ends of the tear line, thereby preventing an over tear phenomenon of the tear line, and allowing the airbag to be deployed in accordance with design intention.

The effect of the present invention is not limited to the aforementioned effect, and other effects, which are not mentioned above, will be clearly understood by those skilled in the art from the claims.

DETAILED DESCRIPTION

Advantages and features of the present invention and methods of achieving the advantages and features will be clear with reference to an exemplary embodiment described in detail below together with the accompanying drawings. However, the present invention is not limited to the exemplary embodiment set forth below, and may be embodied in various other forms. The present exemplary embodiment is for rendering the disclosure of the present invention complete and is set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to an exemplary embodiment of the present invention will be described with reference to the drawings.

Figure 1:
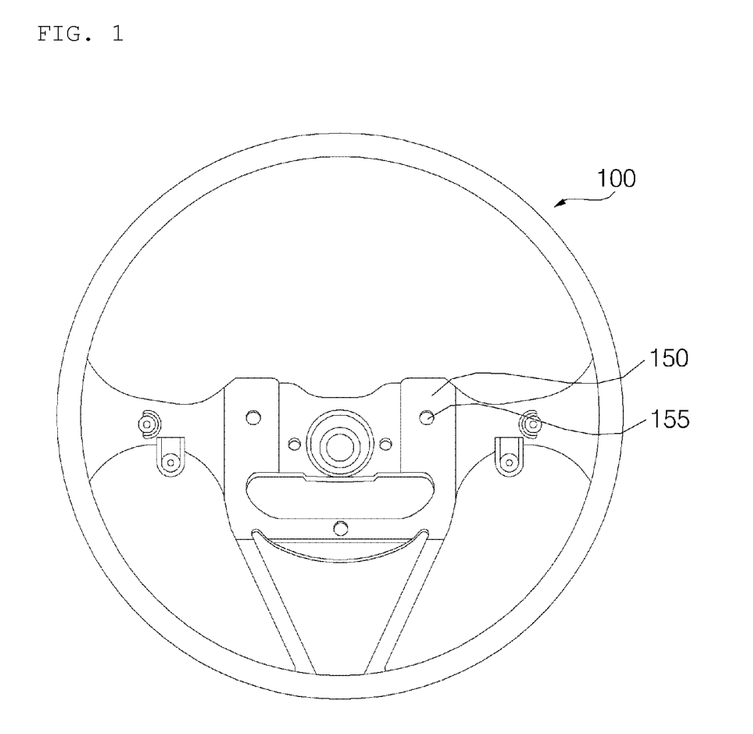
FIG. 1 is a view illustrating a steering wheel on which an airbag apparatus according to an exemplary embodiment of the present invention is mounted.
Figure 2:
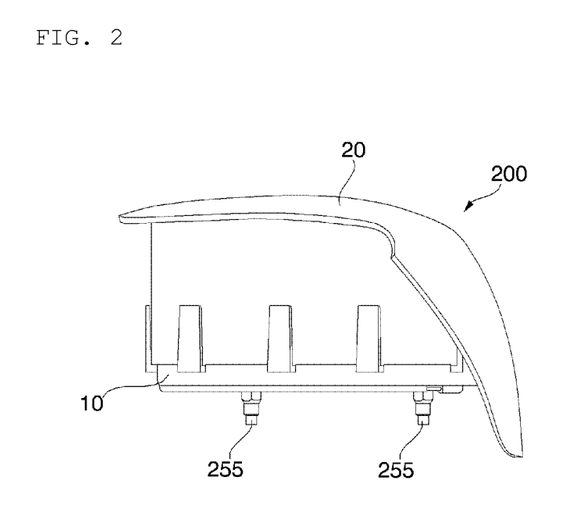
FIG. 2 is a view illustrating an airbag module of the airbag apparatus according to the exemplary embodiment of the present invention.

FIG. 1 is a view illustrating a steering wheel 100 on which the airbag apparatus according to the exemplary embodiment of the present invention is mounted, and FIG. 2 is a view illustrating an airbag module 200 of the airbag apparatus according to the exemplary embodiment of the present invention.

Referring to FIGS. 1 and 2, a steering wheel 100, which performs a steering function of a vehicle by manipulation of a driver, is disposed in front of a driver seat, and an airbag module 200, which protects the driver at the time of a vehicle accident, is mounted on a central portion of the steering wheel 100.

A mounting plate 150, which has coupling holes 155 to which the airbag module 200 is coupled, is disposed at the central portion of the steering wheel 100, and coupling members 255, which are coupled to coupling holes 155 of the mounting plate 150, are disposed on the airbag module 200, such that the airbag module 200 is coupled to the central portion of the steering wheel 100 by inserting the coupling members 255 into the coupling holes 155.

The airbag module 200 includes an airbag housing 10, and an airbag cover 20.

Three coupling members 255 are disposed to protrude downward on the airbag housing 10. That is, the airbag housing 10 is coupled to the steering wheel 100 by the three coupling member 255. Since FIG. 2 is a side view of the airbag module 200, only two coupling members 255 are illustrated in FIG. 2, but one more coupling member 255 is disposed behind the coupling member 255 that is illustrated at the right side of FIG. 2.

The airbag housing 10 has a vacant structure, and an airbag (not illustrated) is accommodated in a vacant internal space of the airbag housing 10 in a state in which the airbag is folded several times.

The airbag cover 20 is coupled to the airbag housing 10 while covering the airbag, which is accommodated in the airbag housing 10, at the upper side of the airbag housing 10.

The inside of the airbag cover 20 may be made of a plastic material, and the outside of the airbag cover 20 may be made of a leather material. The airbag cover 20 defines an external appearance of the central portion of the steering wheel 100 after the airbag module 200 is coupled to the steering wheel 100.

The airbag is accommodated in the airbag housing 10, and when gas generated by a gas generator (not illustrated) flows into the airbag, the airbag breaks through the airbag cover 20 and is deployed while being expanded, thereby protecting the driver using cushioning.

Figure 3:
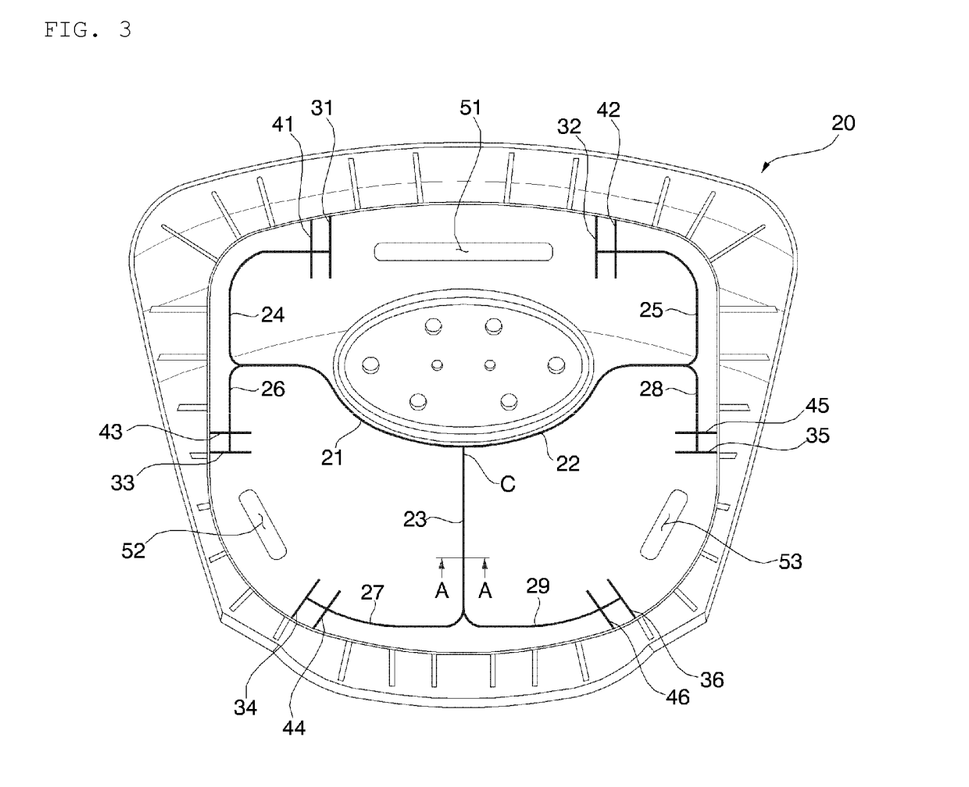
FIG. 3 is a view illustrating a back surface of an airbag cover illustrated in FIG. 2.
Figure 4:
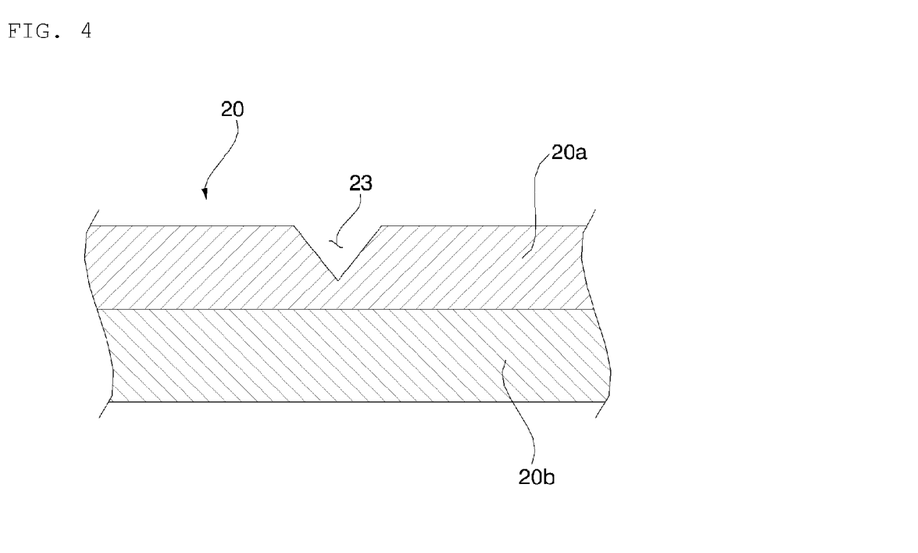
FIG. 4 is a cross-sectional view taken along line A-A of FIG. 3.

FIG. 3 is a view illustrating a back surface of the airbag cover 20 illustrated in FIG. 2, and FIG. 4 is a cross-sectional view taken along line A-A of FIG. 3.

Referring to FIGS. 3 and 4, the airbag cover 20 needs to be easily torn by expansive force of the airbag so that the airbag may be deployed. Tear lines 21, 22, 23, 24, 25, 26, and 27, which are torn by expansive force of the airbag, are formed on the back surface of the airbag cover 20 so that the airbag cover 20 may be easily torn by expansive force of the airbag.

A back surface 20a of the airbag cover 20 is made of a plastic material, and a front surface 20b of the airbag cover 20 is made of a leather material. As illustrated in FIG. 4, the tear lines 21, 22, 23, 24, 25, 26, and 27 are formed by cutting out the back surface 20a made of a plastic material in a V shape.

The tear lines 21, 22, 23, 24, 25, 26, and 27 may be variously formed in accordance with a size and a shape of the airbag cover 20. For better understanding of the description, for example, in a case in which only the tear lines 21, 22, 24, and 25 are formed on the airbag cover 20, the tear lines 21, 22, 24, and 25 illustrated in FIG. 3 are formed to have larger sizes, such that the tear lines 21, 22, 24, and 25 may be formed along a circumference of the back surface 20a of the airbag cover 20. That is, the tear lines 21 and 22 may be formed at the lower side of the back surface 20a of the airbag cover 20, the tear line 24 is formed longer than that illustrated in FIG. 3 such that the tear line 24 may be disposed at the left side of the back surface 20a of the airbag cover 20, and may have an upper end that is formed to be curved rightward, and the tear line 25 is formed longer than that illustrated in FIG. 3 such that the tear line 25 may be disposed at the right side of the back surface 20a of the airbag cover 20, and may have an upper end that is formed to be curved leftward.

Hereinafter, the case in which only the tear lines 21, 22, 24, and 25 are formed on the airbag cover 20 will be first described.

When the tear lines 21, 22, 24, and 25 are torn by expansive force of the airbag, the airbag cover 20 is opened while being rotated about a portion between both ends of the tear lines 21, 22, 24, and 25 as a rotation center. The portion between both the ends of the tear lines 21, 22, 24, and 25 is called a hinge portion in the corresponding technical field. Hereinafter, in the description, the hinge portion means the portion between both the ends of the tear lines 21, 22, 24, and 25.

Regarding the tear lines 21, 22, 24, and 25, the central portion is disposed at the lower side and formed to be elongated leftward and rightward, the left side is curved upward and formed to be elongated upward and downward, an end of the left side is curved rightward such that the left side is formed to be elongated leftward and rightward, the right side is curved upward and formed to be elongated upward and downward, and an end of the right side is curved leftward such that the right side is formed to be elongated leftward and rightward. Here, both the ends of the tear lines 21, 22, 24, and 25 are disposed to be spaced apart from each other. In addition, a virtual straight line, which connects both the ends of the tear lines 21, 22, 24, and 25, is a horizontal line.

First notch portions 31 and 32, which are cut out in a direction in which the first notch portions 31 and 32 cross both the ends of the tear lines 21, 22, 24, and 25, are formed at both the ends of the tear lines 21, 22, 24, and 25, respectively. Similar to the tear lines 21, 22, 24, and 25, the first notch portions 31 and 32 may be formed by cutting out the back surface 20a of the airbag cover 20 so that the first notch portions 31 and 32 have a V-shaped cross section.

When the tear lines 21, 22, 24, and 25 are torn by expansive force of the airbag, the first notch portions 31 and 32 reduce torsion stress being transmitted to the hinge portion, thereby preventing the hinge portion from being torn. Therefore, when the airbag escapes from the airbag cover 20, the airbag escapes without leaning to one side, and as a result, the airbag may be deployed in accordance with design intention for protecting the driver.

The first notch portions 31 and 32 may be formed in a direction orthogonal to both the ends of the tear lines 21, 22, 24, and 25.

Second notch portions 41 and 42, which are cut out in a direction in which the second notch portions 41 and 42 cross both the ends of the tear lines 21, 22, 24, and 25, may be further formed at both the ends of the tear lines 21, 22, 24, and 25, respectively. The second notch portions 41 and 42 are disposed to be spaced apart from the first notch portions 31 and 32. Similar to the tear lines 21, 22, 24, and 25 and the first notch portions 31 and 32, the second notch portions 41 and 42 may be formed by cutting out the back surface 20a of the airbag cover 20 so that the second notch portions 41 and 42 have a V-shaped cross section.

Similar to the first notch portions 31 and 32, the second notch portions 41 and 42 may be formed in a direction orthogonal to both the ends of the tear lines 21, 22, 24, and 25. That is, the first notch portions 31 and 32 and the second notch portions 41 and 42 may be formed to be parallel with each other.

In a case in which the first notch portions 31 and 32 and the second notch portions 41 and 42 are formed at both the ends of the tear lines 21, 22, 24, and 25, as described above, when the tear lines 21, 22, 24, and 25 are torn by expansive force of the airbag, torsion stress being transmitted to the hinge portion is primarily reduced while passing through the second notch portions 41 and 42, and secondarily reduced while passing through the first notch portions 31 and 32, thereby more surely preventing the hinge portion from being torn in comparison with a case in which only the first notch portions 31 and 32 are formed.

A groove 51 is further formed in the airbag cover 20 by cutting out a part of the hinge portion. When the tear lines 21, 22, 24, and 25 are torn by expansive force of the airbag, and thereafter, the airbag cover 20 is rotated about the hinge portion, the groove 51 allows the hinge portion to be easily rotated without being damaged.

The groove 51 may be disposed on the virtual straight line, which connects both the ends of the tear lines 21, 22, 24, and 25, and may be formed to be elongated leftward and rightward.

Figure 5:
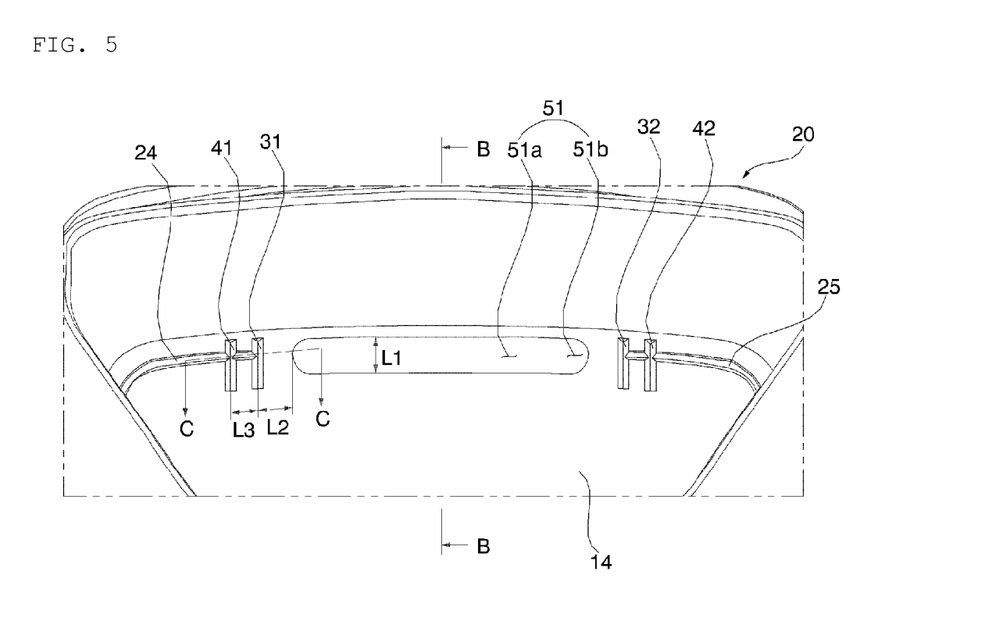
FIG. 5 is an enlarged view of a main part of FIG. 3.
Figure 6:
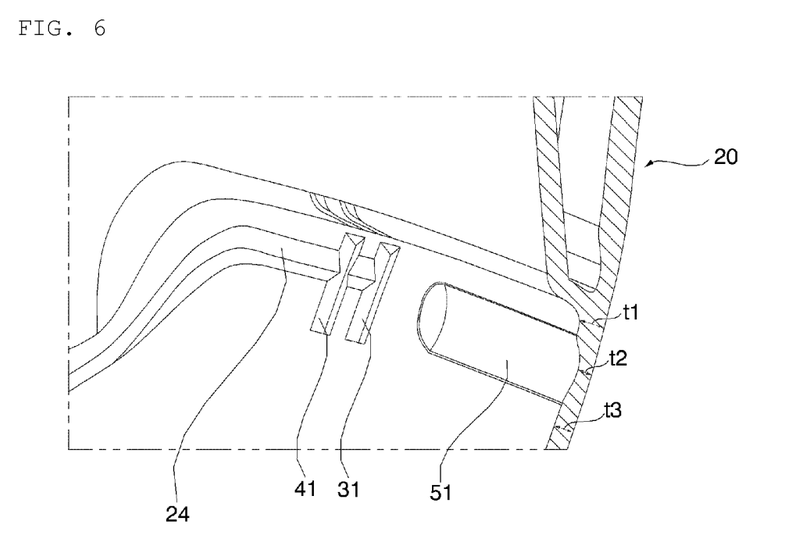
FIG. 6 is a cut-away perspective view taken along line B-B of FIG. 5.

FIG. 5 is an enlarged view of the main part of FIG. 3, and FIG. 6 is a cut-away perspective view taken along line B-B of FIG. 5.

Referring to FIGS. 5 and 6, the groove 51 has a wider width and a smaller depth than the tear lines 21, 22, 24, and 25.

The groove 51 includes a straight portion 51a which is straightly formed, and round portions 51b which are rounded at both ends of the straight portion 51a, respectively. In the present exemplary embodiment, the straight portion 51a has a vertical width L1 of 7 mm, and the round portion 51b has a radius of curvature of 3.58 mm.

Based on the groove 51, the airbag cover 20 has an outside thickness t1 at an outside (an upper side in FIG. 6) that is greater than an inside thickness t3 at an inside (a lower side in FIG. 6). In the present exemplary embodiment, a smallest thickness t2 of the airbag cover 20 at a portion where the groove 51 is formed is 1.8 mm, the outside thickness t1 based on the groove 51 is 3 mm, and the inside thickness t3 based on the groove 51 is 2.5 mm.

An interval L2 between the first notch portion 31 and the groove 51 is greater than an interval between the first notch portion 31 and the second notch portion 41. In the present exemplary embodiment, the interval L2 between the first notch portion 31 and the groove 51 is 7 mm, and the interval L3 between the first notch portion 31 and the second notch portion 41 is 5 mm. Of course, an interval between the first notch portion 32 and the groove 51 is also 7 mm, and an interval between the first notch portion 32 and the second notch portion 42 is also 5 mm.

Figure 7:
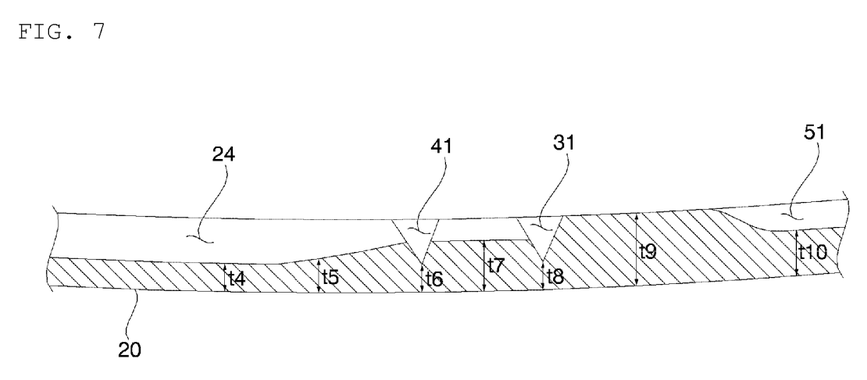
FIG. 7 is a cross-sectional view taken along line C-C of FIG. 5.

FIG. 7 is a cross-sectional view taken along line C-C of FIG. 5.

Referring to FIG. 7, the airbag cover 20 cancels torsion stress being transmitted to the hinge portion in a step wise manner while repeatedly becoming thicker and thinner from the end of the tear lines 21, 22, 24, and 25 toward the hinge portion, thereby preventing torsion stress from being transmitted to the hinge portion.

That is, in the airbag cover 20, a thickness t4 at portions where the tear lines 21, 22, 24, and 25 are formed is formed as a first thickness, a thickness t5 at portions where ends of the tear lines 21, 22, 24, and 25 are formed becomes gradually greater from the first thickness to a second thickness, a thickness t6 at a portion where the second notch portion 41 is formed as a third thickness that is smaller than the second thickness, a thickness t7 between the second notch portion 41 and the first notch portion 31 is formed as a fourth thickness that is greater than the third thickness, a thickness t8 at a portion where the first notch portion 31 is formed is formed as a fifth thickness that is smaller than the fourth thickness, a thickness t9 between the first notch portion 31 and the groove 51 is formed as a sixth thickness that is greater than the fifth thickness, and a thickness t10 at a portion where the groove 51 is formed is formed as a seventh thickness that is smaller than the sixth thickness.

In the present exemplary embodiment, the first thickness, the third thickness, and the fifth thickness are equal to each other, the second thickness and the fourth thickness are equal to each other, the sixth thickness is greatest, and the seventh thickness is greater than the second thickness. That is, a depth at which the first notch portion 31 and the second notch portion 41 are cut out is equal to a depth at which the tear lines 21, 22, 24, and 25 are cut out, and a portion between the first notch portion 31 and the groove 51 is not cut out, and is formed to have a basic thickness of the airbag cover 20.

Hereinafter, a case in which all of the tear lines 21, 22, 23, 24, 25, 26, and 27 are formed will be described with reference back to FIG. 3.

Referring to FIG. 3, the tear lines 21, 22, 23, 24, 25, 26, and 27 include a first tear line 21, a second tear line 22, a third tear line 23, a fourth tear line 24, a fifth tear line 25, a sixth tear line 26, a seventh tear line 27, an eighth tear line 28, and a ninth tear line 29.

The first tear line 21 is formed leftward from a center C of the airbag cover 20, the second tear line 22 is formed rightward from the center C, and the third tear line 23 is formed downward from the center C.

The fourth tear line 24 is formed upward from the left side of the first tear line 21, and an end of the fourth tear line 24 is curved rightward so as to form one end of the tear lines 21, 22, 24, and 25. The fifth tear line 25 is formed upward from the right side of the second tear line 22, and an end of the fifth tear line 25 is curved leftward so as to form the other end of the tear lines 21, 22, 24, and 25.

The first notch portion 31 and the second notch portion 41 are formed at an end of the fourth tear line 24, the first notch portion 32 and the second notch portion 42 are formed at an end of the fifth tear line 25, and the groove 51 is formed between the end of the fourth tear line 24 and the end of the fifth tear line 25.

The sixth tear line 26 is formed downward from the left side of the first tear line 21, and forms one end of the tear lines 21, 23, 26, and 27. The seventh tear line 27 is formed leftward from the lower side of the third tear line 23, and forms the other end of the tear lines 21, 23, 26, and 27.

A first notch portion 33 and a second notch portion 43 are formed at an end of the sixth tear line 26, a first notch portion 34 and a second notch portion 44 are formed at an end of the seventh tear line 27, and a groove 52 is formed between the end of the sixth tear line 26 and the end of the seventh tear line 27.

The eighth tear line 28 is formed downward from the right side of the second tear line 22, and form one end of the tear lines 22, 23, 28, and 29. The ninth tear line 29 is formed rightward from the lower side of the third tear line 23, and forms the other end of the tear lines 22, 23, 28, and 29.

A first notch portion 35 and a second notch portion 45 are formed at an end of the eighth tear line 28, a first notch portion 36 and a second notch portion 46 are formed at an end of the ninth tear line 29, and a groove 53 is formed between the end of the eighth tear line 28 and the end of the ninth tear line 29.

In a case in which all of the tear lines 21, 22, 23, 24, 25, 26, 27, 28, and 29 are formed on the airbag cover 20 as described above, when the tear lines 21, 22, 23, 24, 25, 26, 27, 28, and 29 are torn by expansive force of the airbag, the airbag cover 20 is opened while being rotated about the hinge portions as rotation centers, which are the hinge portion between the end of the fourth tear line 24 and the end of the fifth tear line 25, the hinge portion between the end of the sixth tear line 26 and the end of the seventh tear line 27, and the hinge portion between the end of the eighth tear line 28 and the end of the ninth tear line 29.

As described above, the airbag apparatus according to the present invention prevents an over tear phenomenon in which even the hinge portions are torn by torsion stress being transmitted to the hinge portions while the tear lines 21, 22, 23, 24, 25, 26, 27, 28, and 29 are torn, such that the airbag may be deployed in accordance with design intention for protecting the driver.

It may be understood to the person skilled in the art that the present invention may be implemented as other specific forms without changing the technical spirit or the essential characteristics. Thus, it should be appreciated that the exemplary embodiment described above is intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. An airbag apparatus comprising:
    an airbag housing which accommodates an airbag; and
    an airbag cover which is coupled to the airbag housing while covering the airbag accommodated in the airbag housing, and has a tear line that is torn by expansive force of the airbag,
    wherein the airbag cover is opened while being rotated about a portion between both ends of the tear line as a rotation center when the tear line is torn, and first notch portions, which are cut out in a direction in which the first notch portions cross both ends of the tear line, are formed at both ends of the tear line, respectively,
    wherein a groove is further formed in the airbag cover by cutting out a portion between both the ends of the tear line,
    wherein the airbag cover has a greater thickness at the outside thereof than at the inside thereof based on the groove.

2. The airbag apparatus of claim 1, wherein the first notch portions are formed in a direction orthogonal to both the ends of the tear line.

3. The airbag apparatus of claim 1, wherein the groove has a wider width and a smaller depth than the tear line.

4. The airbag apparatus of claim 1, wherein the groove is disposed on a straight line that connects both the ends of the tear line.

5. The airbag apparatus of claim 1, wherein the groove includes a straight portion which is straightly formed, and round portions which are rounded at both ends of the straight portion, respectively.

6. An airbag apparatus comprising:
    an airbag housing which accommodates an airbag; and
    an airbag cover which is coupled to the airbag housing while covering the airbag accommodated in the airbag housing, and has a tear line that is torn by expansive force of the airbag,
    wherein the airbag cover is opened while being rotated about a portion between both ends of the tear line as a rotation center when the tear line is torn, and first notch portions, which are cut out in a direction in which the first notch portions cross both ends of the tear line, are formed at both ends of the tear line, respectively,
    wherein the tear line is formed as a plurality of tear lines including:
    a first tear line which is formed leftward from a center of the airbag cover;
    a second tear line which is formed rightward from the center;
    a third tear line which is formed downward from the center;
    a fourth tear line which is formed upward from the left side of the first tear line, and has an end that is curved rightward so as to form one end of the tear line;
    a fifth tear line which is formed upward from the right side of the second tear line, and has an end that is curved leftward so as to form the other end of the tear line;
    a sixth tear line which is formed downward from the left side of the first tear line, and forms one end of the tear line;
    a seventh tear line which is formed leftward from the lower side of the third tear line, and forms the other end of the tear line;
    an eighth tear line which is formed downward from the right side of the second tear line, and forms one end of the tear line; and
    a ninth tear line which is formed rightward from the lower side of the third tear line, and forms the other end of the tear line.

7. An airbag apparatus comprising:
    an airbag housing which accommodates an airbag; and
    an airbag cover which is coupled to the airbag housing while covering the airbag accommodated in the airbag housing, and has a tear line that is torn by expansive force of the airbag,
    wherein the airbag cover is opened while being rotated about a portion between both ends of the tear line as a rotation center when the tear line is torn, and first notch portions, which are cut out in a direction in which the first notch portions cross both the ends of the tear line, and second notch portions, which are spaced apart from the first notch portions and cut out in a direction in which the second notch portions cross both the ends of the tear line, are formed at both the ends of the tear line, respectively.

8. The airbag apparatus of claim 7, wherein the first notch portions and the second notch portions are formed to be parallel with each other.

9. The airbag apparatus of claim 7, wherein the first notch portions and the second notch portions are formed in a direction orthogonal to both the ends of the tear line.

10. The airbag apparatus of claim 7, wherein a groove is further formed in the airbag cover by cutting out a portion between both the ends of the tear line.

11. The airbag apparatus of claim 10, wherein the groove has a wider width and a smaller depth than the tear line.

12. The airbag apparatus of claim 10, wherein the groove is disposed on a straight line that connects both the ends of the tear line.

13. The airbag apparatus of claim 10, wherein the groove includes a straight portion which is straightly formed, and round portions which are rounded at both ends of the straight portion, respectively.

14. The airbag apparatus of claim 10, wherein the airbag cover has a greater thickness at the outside thereof than at the inside thereof based on the groove.

15. The airbag apparatus of claim 10, wherein an interval between the first notch portion and the groove is greater than an interval between the first notch portion and the second notch portion.

16. The airbag apparatus of claim 10, wherein as thicknesses of the airbag cover, a thickness at a portion where the tear line is formed is formed as a first thickness, a thickness at a portion where an end of the tear line is formed becomes gradually greater from the first thickness to a second thickness, a thickness at a portion where the second notch portion is formed is formed as a third thickness that is smaller than the second thickness, a thickness at a portion between the second notch portion and the first notch portion is formed as a fourth thickness that is greater than the third thickness, a thickness at a portion where the first notch portion is formed is formed as a fifth thickness that is smaller than the fourth thickness, a thickness at a portion between the first notch portion and the groove is formed as a sixth thickness that is greater than the fifth thickness, and a thickness at a portion where the groove is formed is formed as a seventh thickness that is smaller than the sixth thickness.

17. The airbag apparatus of claim 16, wherein the first thickness, the third thickness, and the fifth thickness are equal to each other, the second thickness and the fourth thickness are equal to each other, the sixth thickness is greatest, and the seventh thickness is greater than the second thickness.

18. The airbag apparatus of claim 7, wherein the tear line is formed as a plurality of tear lines including:
    a first tear line which is formed leftward from a center of the airbag cover;
    a second tear line which is formed rightward from the center;
    a third tear line which is formed downward from the center;
    a fourth tear line which is formed upward from the left side of the first tear line, and has an end that is curved rightward so as to form one end of the tear line;
    a fifth tear line which is formed upward from the right side of the second tear line, and has an end that is curved leftward so as to form the other end of the tear line;
    a sixth tear line which is formed downward from the left side of the first tear line, and forms one end of the tear line;
    a seventh tear line which is formed leftward from the lower side of the third tear line, and forms the other end of the tear line;
    an eighth tear line which is formed downward from the right side of the second tear line, and forms one end of the tear line; and
    a ninth tear line which is formed rightward from the lower side of the third tear line, and forms the other end of the tear line.

* * * * *